United States Patent [19]

Proietti

[11] Patent Number: 5,778,315
[45] Date of Patent: Jul. 7, 1998

[54] INTEGRATED MOBILE UNIT LOCATION SERVICES AND CELLULAR TELEPHONE SERVICES

[75] Inventor: Mario Proietti, Fullerton, Calif.

[73] Assignee: Teletrac, Inc., Kansas City, Mo.

[21] Appl. No.: 442,194

[22] Filed: May 16, 1995

[51] Int. Cl.[6] .................................................. H04B 7/32
[52] U.S. Cl. ............................................. 455/419; 455/432
[58] Field of Search ............................ 455/11.1, 17, 33.1, 455/53.1, 507, 54.1, 54.2, 56.1, 517, 510, 524, 422, 432, 439, 445, 409, 461, 419; 379/58–59, 60

[56] References Cited

U.S. PATENT DOCUMENTS

| | | |
|---|---|---|
| 4,651,156 | 3/1987 | Martinez . |
| 4,651,157 | 3/1987 | Gray et al. . |
| 4,700,374 | 10/1987 | Bini . |
| 4,747,122 | 5/1988 | Bhagat et al. . |
| 4,775,999 | 10/1988 | Williams . |
| 4,817,190 | 3/1989 | Comroe et al. . |
| 4,833,701 | 5/1989 | Comroe et al. . |
| 4,897,642 | 1/1990 | DiLullo et al. . |
| 5,016,269 | 5/1991 | Rogers . |
| 5,046,082 | 9/1991 | Zicker et al. . |
| 5,200,995 | 4/1993 | Gaukel et al. ........................ 379/200 |
| 5,235,633 | 8/1993 | Dennison . |
| 5,276,729 | 1/1994 | Higuchi et al. . |
| 5,297,191 | 3/1994 | Gerszberg ............................... 455/419 |
| 5,297,192 | 3/1994 | Gerszberg ............................... 455/419 |
| 5,301,223 | 4/1994 | Amadon . |
| 5,337,345 | 8/1994 | Cassidy et al. ....................... 455/33.1 |
| 5,353,340 | 10/1994 | Kunz ...................................... 379/60 |
| 5,423,060 | 6/1995 | Masuda et al. ....................... 455/54.1 |
| 5,438,609 | 8/1995 | Yahagi ................................... 379/58 |
| 5,454,027 | 9/1995 | Kennedy et al. . |
| 5,485,505 | 1/1996 | Norman et al. ....................... 379/58 |
| 5,528,681 | 6/1996 | Iwai et al. . |

FOREIGN PATENT DOCUMENTS 0 344 989 12/1989 European Pat. Off. .
9114349 9/1991 WIPO .

*Primary Examiner*—Edward F. Urban
*Attorney, Agent, or Firm*—Roylance, Abrams, Berdo & Goodman, L.L.P.

[57] ABSTRACT

An apparatus and method for sharing cellular telephone subscriptions among a plurality of mobile units in a mobile unit location system. Requests for cellular service are transmitted from a mobile unit to a cellular phone identity service provider via the mobile unit location system. The service provider grants or denies the request. If the request is granted a cellular phone identity is provided to the mobile unit location service for downloading into the mobile unit. The cellular phone connected to the mobile unit is then programmed with the cellular phone identity so that cellular service can be initiated.

37 Claims, 4 Drawing Sheets

INTEGRATED MOBILE UNIT LOCATION SERVICES AND CELLULAR TELEPHONE SERVICES

BACKGROUND OF THE INVENTION

1. Field of the Invention

The present invention relates generally to integrated mobile unit location services and cellular phone services, and in particular, to a method and apparatus for the remote programming and control of cellular telephones, wherein a limited number of cellular telephone subscriptions are shared among a plurality of programmable phones coupled to mobile location units.

2. Description of the Related Art

Cellular telephones have revolutionized remote communications by providing high quality point-to-point communications for a large number of users. However, cellular telephone services are expensive.

There are two factors contributing to the high cost of cellular telephone service: high recurring subscription costs, and high air time costs, especially when roaming from one cellular service area to another. The high cost of cellular service is especially apparent when applied to group or collective operations. If cellular service is provided to each of a fleet of vehicles, the operator must absorb the high recurring costs of a cellular subscription for each vehicle. Also, when used for fleet operations, cellular service is particularly vulnerable to abuse and overuse. Since the on-air time for cellular calls is expensive, this is also a significant contributor to the expense of providing cellular service to fleet operations. Also, the fixed monthly subscription cost is high for those consumers who only wish to use a cellular phone for occasional/emergency needs.

The present invention solves these problems by integrating vehicle or mobile unit location services with cellular telephone services. The present invention relates to a method and apparatus for managing and sharing a limited number of cellular subscriptions among a group of cellular phones by remote programming via an independent communications channel provided by the mobile location services.

The present invention reduces the costs of such group, collective, or occasional cellular telephone operations in three ways. First, by allowing multiple users to share cellular phone subscriptions, recurring subscription costs on a per user basis are drastically reduced. Second, cellular air time costs are reduced because remote access to cellular telephone services are closely managed and controlled. Finally, cellular service costs are reduced by reducing the probability of incurring roaming costs.

SUMMARY OF THE INVENTION

To overcome the limitations in the prior art described above, and to overcome other limitations that will become apparent upon reading and understanding the present specification, the present invention discloses a method and apparatus for sharing cellular phone identities among a plurality of programmable cellular phones coupled to mobile units, wherein the cellular phone identities are downloaded into the cellular phones via the mobile unit. A cellular phone identity is downloaded from the location system to a cellular phone via the mobile unit in response to the notification of an incoming call for the cellular phone user, or in response to a request for an outgoing call from the cellular phone user. The cellular phone connected to the mobile unit is then programmed with the cellular phone identity received from a cellular phone identity service provider (ISP).

Generally, the cellular phone identity comprises a mobile identification number (MIN) and an electronic serial number (ESN). However, the cellular phone identity may also comprise other operational parameters, such as a cellular telephone service provider selection. The selection of the cellular phone identity can be made dependent on the location of the mobile unit, as determined by a signal received from the mobile unit, or as determined by a location of a receiver of the request transmitted by the mobile unit.

The cellular phone identity typically will be used by only one cellular phone at a time. The cellular phone may retain the cellular phone identity for a pre-determined duration, such as until the end of a call, after a pre-determined number of calls, or after a pre-determined time period. Thereafter, the cellular phone identity is released by the cellular phone by transmitting a release message to the cellular phone identity service provider via the mobile location service, thereby relinquishing the cellular phone identity for another cellular phone. Further, the cellular phone coupled to the mobile unit can be programmed to erase the cellular phone identity when it is relinquished.

The cellular phone identities are maintained in a pool of sharable cellular phone identities managed by the ISP, wherein an ISP may be a dispatcher, a provider of roadside/emergency services, a cellular reseller, the location service provider, etc. The pool of sharable cellular phone identities may comprise sub-pools organized by cellular telephone service provider. In addition, the pool of sharable cellular phone identities may be comprised of sub-pools organized in some manner, e.g., by cellular service area, by fleet identity, by some other logical/functional grouping or combination of groupings of mobile units.

For outgoing calls, the cellular phone may be restricted to calling one or more pre-defined phone numbers or each call may be authorized at the time the call is initiated. The list of allowed phone numbers may be stored in the phone or in a centralized system managed by the ISP. Further, the ISP can closely monitor and report the usage of the cellular phone through call progress/status updates sent to the ISP by the mobile unit via the mobile unit location system.

BRIEF DESCRIPTION OF THE DRAWINGS

Referring now to the drawings in which like reference numbers represent corresponding parts throughout.

DETAILED DESCRIPTION OF THE PREFERRED EMBODIMENT

Figure 1:
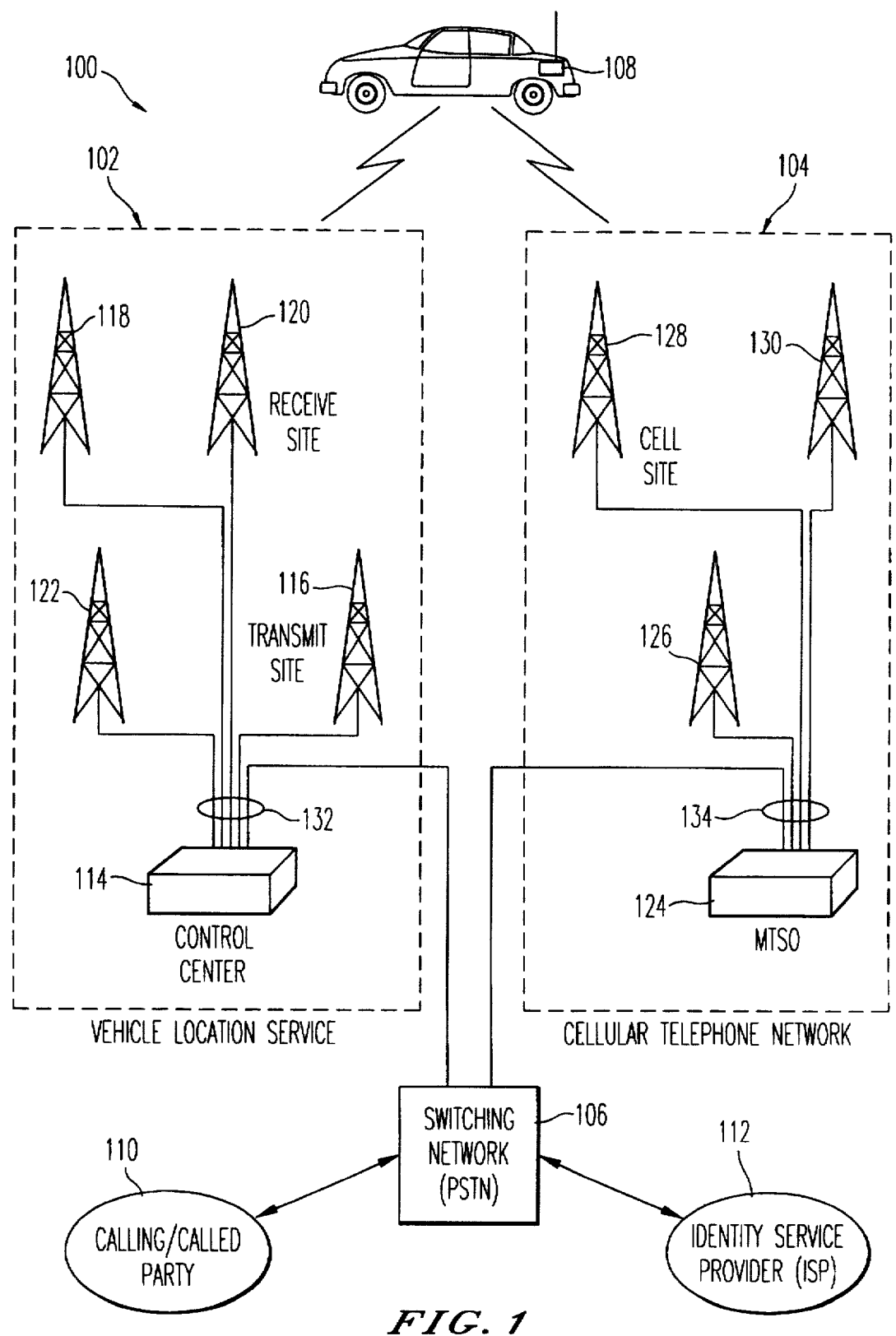
FIG. 1 shows one possible embodiment of the system components according to the present invention.

In the following description of the preferred embodiment, references made to the accompanying drawings which form a part hereof, and in which is shown by way of illustration a specific embodiment in which the invention may be practiced. It is understood that other embodiments may be utilized and structural changes may be made without departing from the scope of the present invention.

OVERVIEW

The present invention comprises a vehicle or mobile unit location service that has been combined with cellular phone service in a way that does not require the consumer or a fleet operator to incur the monthly expense of cellular phone service, but makes it available on a limited or as-needed basis or in emergencies and other situations. The approach also overcomes the problems associated with cellular phone roaming.

A mobile unit and a cellular phone are connected via a serial interface such that the mobile unit location service provides a control channel for the cellular phone through the mobile unit. The mobile unit may be user-portable or placed in a vehicle. When used for vehicle location services, the mobile unit is a vehicle location unit (VLU). The cellular phone does not have a permanent identity or subscription, and is not normally active in the cellular telephone network. The vehicle location service acts the "cellular subscriber" and "lends" the customer a cellular phone identity when needed.

To place a call, the user may either dial a phone number to be called or simply push a button. Further, the user may place a call simply by picking up the handset. This is particularly suitable for calls to pre-defined parties such as roadside assistance service providers or public safety agencies. The cellular phone relays the request to the VLU, which in turn transmits the request to the vehicle location service. The vehicle location system conveys the request to a service provider (typically implemented as a dispatcher's workstation). The authorization for each request is made by the service provider either automatically based on pre-defined rules or call lists, and/or manually based on a decision by a dispatcher. The selection of a cellular phone identity is typically based on the location of the VLU or the location of the receiver(s) that received the request from the VLU. If the request is granted, then the service provider returns a cellular phone identity (i.e., a phone number identification, cellular service provider selection, and any other necessary parameters) to the vehicle location service. The vehicle location system then downloads the cellular phone identity to the VLU over its paging channel. When the VLU receives the downloaded cellular phone identity, it passes it on to the cellular phone, which programs itself for proper operation. After the phone is programmed, either the ISP initiates a call to the programmed cellular phone to patch through incoming calls, in which case the phone programming includes a called phone number and a command for the cellular phone to dial the number, or the cellular phone dials a phone number entered by the user, or stored in the cellular phone's memory.

Using the present invention, the customer can request to call a pre-defined phone number (e.g., "CALL HOME" or "CALL OFFICE"). The number could either be downloaded to the cellular phone at the time of the request, or it could be stored in the cellular phone itself. The present invention can also be expanded to allow the customer to place a call to any phone number, so that the phone is activated on request and the customer could dial a number and get cellular service on demand without having to incur a high monthly cellular phone fee. This is economical since the monthly cost of having both the location service and cellular service probably would be only slightly more than having just the vehicle location service and potentially less than having cellular service alone.

The cellular phone only retains the cellular phone identity for a pre-determined interval, e.g., for a single call or for some limited number of calls or for some limited amount of time. Thereafter, the cellular phone identity is erased from the cellular phone. The VLU sends another message to the vehicle location system and the service provider indicating that the cellular phone identity is no longer being used, thereby freeing up the cellular phone identity for use by another user.

Generally, the present invention needs only a small pool of cellular phone identities (or subscriptions) for each cellular service area, i.e., only enough phone numbers to cover the volume of concurrent calls expected in each area. For most applications, this would be a small fraction of the number of vehicles (phones) in the fleet or service area. Thus, the recurring cost is low, and since the cellular phone identity is selected for a local cellular phone service area, there is no need for roaming. Using the present invention, customers have instant access to a cellular phone whenever necessary without having to incur the high monthly cost of maintaining separate cellular phone subscriptions. The present invention can also be extended to value-added resellers or third party service providers for such applications as emergency roadside, mobile information services, and cellular phone rental.

SYSTEM COMPONENTS

FIG. 1 shows one possible embodiment of the system components according to the present invention. An integrated cellular telephone service and vehicle location service 100 comprises a vehicle location service 102, a cellular telephone network 104, a public switched telephone network (PTSN) 106, one or more subscriber units 108, one or more calling/called parties 110, and a cellular phone identity service provider 112.

The vehicle location service 102, which provides control and monitoring functions for the present invention, preferably comprises the AIRTOUCH™ TELETRAC™ service or other similar service, and includes a control center 114, at least one transmit site 116, and a plurality of receive sites 118, 120, and 122. The control center 114 communicates with the transmit sites 116 and receive sites 118, 120, and 122, via a control center communications interface 132. The control center 114 also communicates with the PSTN 106 via the control center communications interface 132. These communications interfaces may be by wire, fiber optic, radio link or any other suitable medium.

The cellular telephone network 104, which provides conventional cellular phone service for the present invention, preferably comprises a mobile telephone switching office (MTSO) 124, and a plurality of cell sites 126, 128 and 130. The MTSO 124 communicates with the cell sites 126, 128 and 130 via an MTSO communications interface 134. Further, the MTSO 130 communicates with the PSTN 106 via the MTSO communications interface 134. These communication interfaces may be by wire, fiber optic, or radio link, or any other suitable medium.

The PSTN 106 provides conventional telephone access and the interconnects among the vehicle location service 102, cellular phone service 104, calling/called party 110, and service provider 112.

It is envisioned that the cellular phone would have no inherent Electronic Serial Number (ESN) or Mobile Identification Number (MIN), and would be capable of self-programming in response to data received from the VLU.

The cellular phone identity service provider 112 manages the allocation of cellular phone identities to a group or collective of subscriber units 108. Generally, this is accomplished by a computer system that comprises the service provider 112 and that interfaces into the vehicle location service 102 via the PTSN 106.

SUBSCRIBER UNIT COMPONENTS

Figure 2:
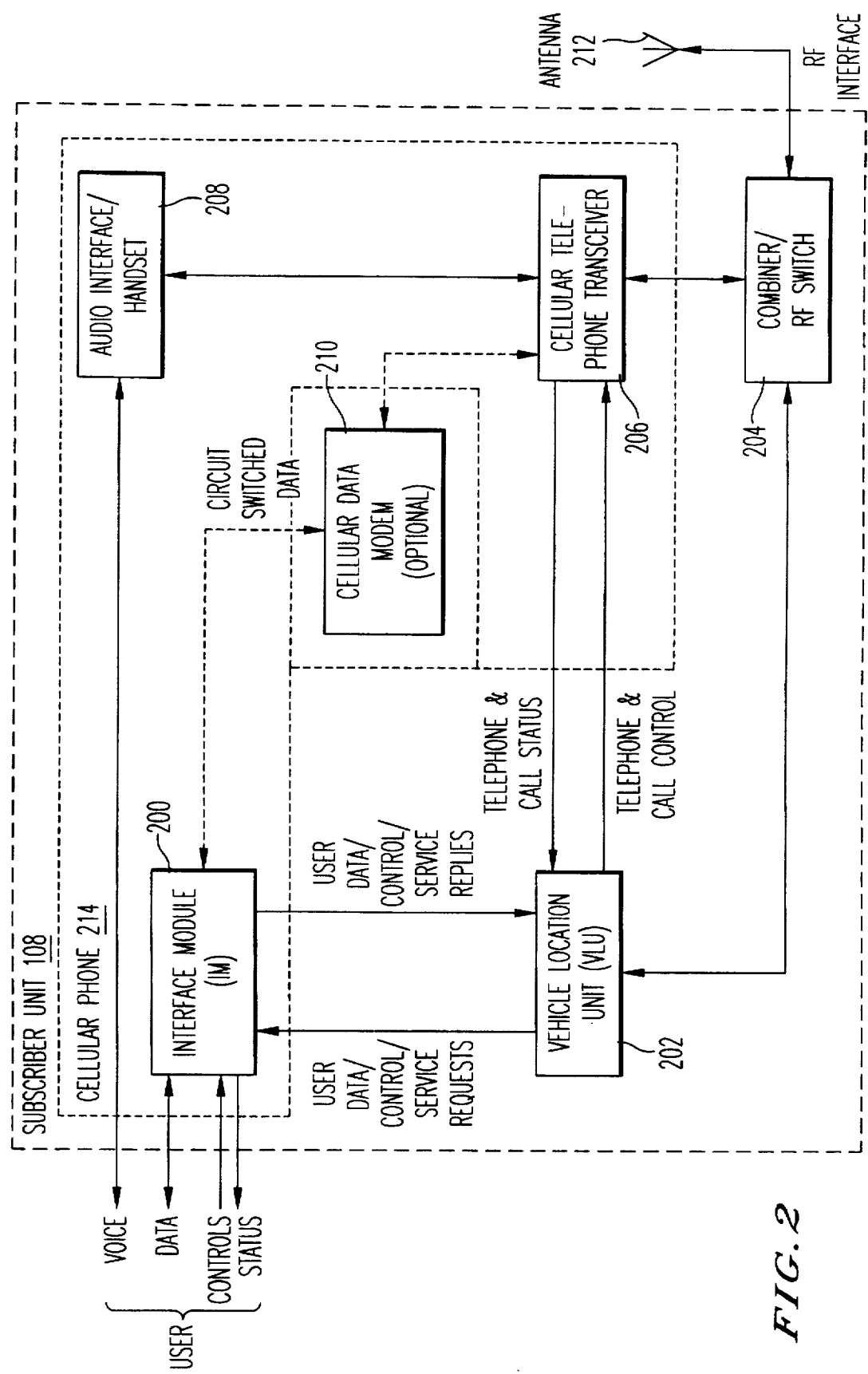
FIG. 2 is a block diagram illustrating the components of a subscriber unit according to the present invention.

FIG. 2 is a block diagram illustrating the components of one embodiment of the subscriber unit 108 according to the present invention. The subscriber unit 108 is typically mounted within a vehicle and comprises a cellular telephone 214, a VLU 202, and a combiner/RF switch 204. The subscriber unit is coupled to an antenna 212 for both VLU 202 and cellular telephone 214 communications. The cellular telephone 214 comprises a cellular telephone transceiver (CTT) 206, an audio interface/handset 208, and an interface module (IM) 200. Optionally, the cellular telephone may also comprise a cellular data modem 210. The interface module (IM) 200 may comprise a numeric keypad, a control panel, a display, and a data interface. The IM 200 may be integrated with or separate from the handset/audio interface 208. The audio interface is typically a microphone and speaker for hands-free operation.

While a single subscriber unit 108 may integrate a VLU and a cellular phone, those skilled in the art will recognize that the cellular phone 214 could be a separate unit electrically and functionally coupled to the VLU 202. For example, the cellular phone 214 could be coupled to the VLU 202 through a serial RS-232 interface or some other communications interface.

While this embodiment shows a single subscriber unit 108 that includes an integrated VLU and cellular phone, those skilled in the art will recognize that the cellular phone 214 could be a separate unit electrically and functionally coupled to the VLU 202.

The cellular phone has no inherent Electronic Serial Number (ESN) or Mobile Identification Number (MIN), provides only temporary storage for downloaded ESNs and MINs, and automatically erases its stored ESN and MIN if disconnected from the VLU 202. Further, the cellular phone 214 includes a number of other special characteristics. In one embodiment, the cellular phone 214 accepts only properly encoded ("scrambled") ESN and MIN combinations from the VLU 202. In addition, the cellular phone 214 outputs call request information to the VLU 202, as well as status indications such as off/on hook, in/out of service, etc. Moreover, the cellular phone 214 accepts commands from the VLU, i.e., SEND, Power OFF, Power ON, etc.

When the user desires access to the cellular telephone network 104, a telephone number is entered into the cellular phone 214 using the IM 200 keypad or other device (computer, etc.) coupled to the IM 200 data interface. The VLU 202 receives the phone number from the IM 200 and generates a request for cellular phone service, which comprises the identification number of the subscriber unit 108. The request is passed from the VLU 202, via the combiner/RF switch 204, to the antenna 212 for transmission to the vehicle location service 102. Other messages transmitted to the vehicle location system 102 include page acknowledgements, requests for cellular service, release messages, etc.

When receiving a page from the transmit site 114 of the vehicle location service 102, the page message is provided to the VLU 202 via the antenna 212, and the combiner/RF switch 204. After the carrier is stripped from the signal and the retrieved data is decoded, the VLU 202 recognizes the page address as its own identification and thereafter reacts accordingly. For example, the page messages received from the vehicle location system 102 may include downloaded cellular phone information, status inquiries, forced release messages, etc.

All messages received at the antenna 212 from the vehicle location service 102 are provided to the VLU 202 for processing. If the message is simply a page, then the VLU 202 responds accordingly, e.g., by transmitting a spread spectrum signal and its own identification in a particular time frame defined by the page. This transmission serves as an acknowledgement of the page and for the remote determination of the VLU 202 position by multilateration. If the page message also includes cellular phone programming information, then the programming information is provided to the cellular phone 214 by the VLU 202, so that the user can complete a telephone call as desired using the handset 208 in a normal manner. After the cellular phone identity is released, the VLU 202 erases the ESN/MIN combination that was sent to the cellular phone 214, thereby disabling the user from the using the cellular telephone subscription unless again authorized to do so.

It is also envisioned that the VLU 202 monitors the cellular telephone 214 and records the usage of the cellular phone 214. This information can be reported to the service provider 112 by transmitting the information via the vehicle location system 102 in a manner similar to the transfer of call setup and call destination information.

CALLS FROM THE SUBSCRIBER UNIT

Figure 3:
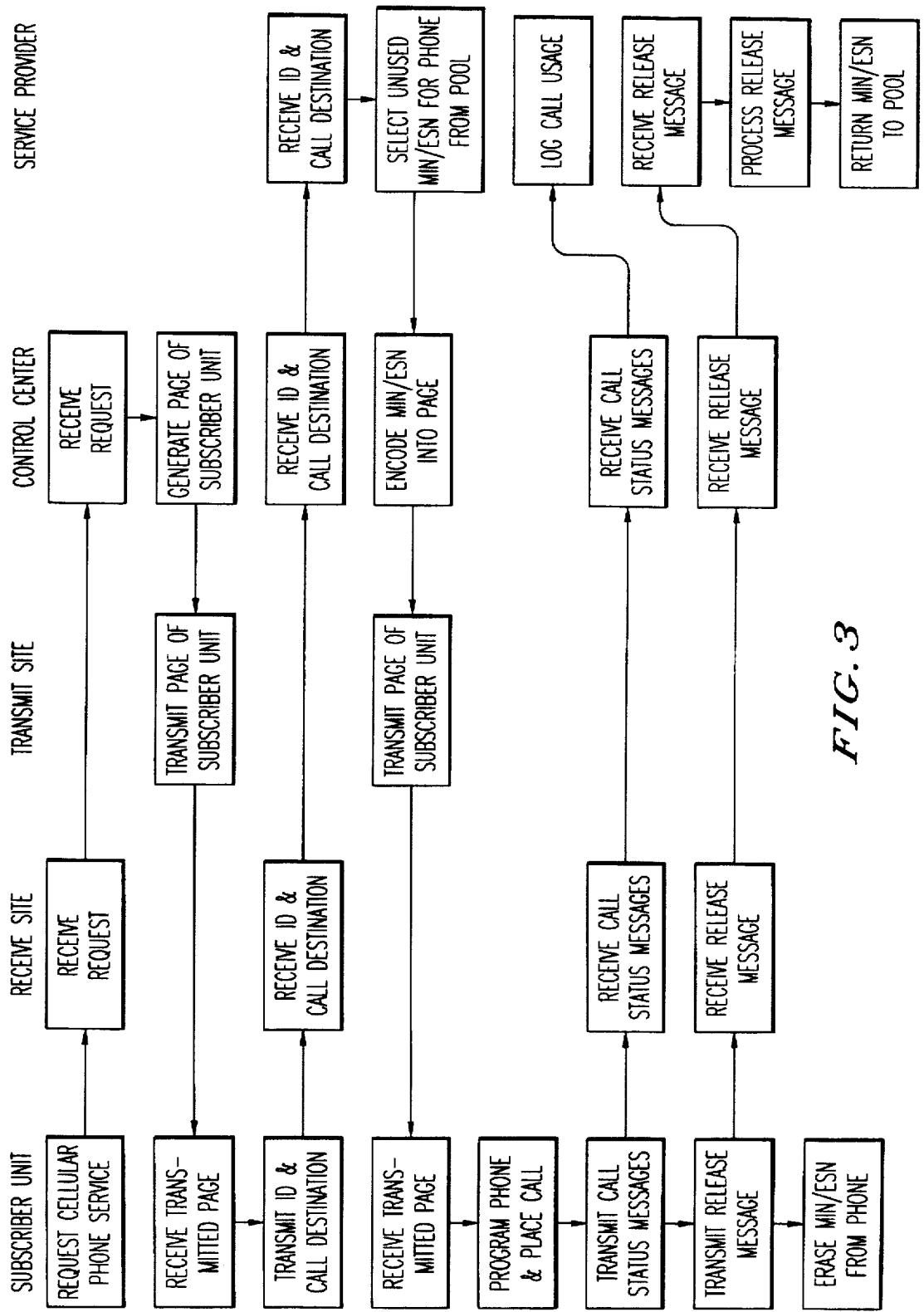
FIG. 3 is a diagram illustrating the operation of the present invention when a request for cellular phone service originates from a subscriber unit.

FIG. 3 is a diagram illustrating the operation of the present invention when a request for cellular phone service originates from the subscriber unit 108. In the preferred embodiment, this request is made when the user presses a single button on the control panel or keypad of the IM 200 (for pre-defined phone numbers) or enters a phone number into the cellular phone and presses the "SEND" key on the keypad of the IM 200. The subscriber unit 108 recognizes these events and transmits a request for cellular phone service to the vehicle location service 102. One or more receive sites 118, 120, and 122 of the vehicle location service 102 receive the request, and forward it to the control center 114 of the vehicle location service 102. Thereafter, the control center 114 initiates a page of the subscriber unit 108 and the transmit site 116 transmits the page to the subscriber unit 108. The subscriber unit 108 responds to the page by transmitting a data stream that includes its identification and the call destination for the cellular phone service request. One or more receive sites 118, 120, and 122 of the vehicle location service 102 receive the data stream, and forward it to the control center 114 of the vehicle location service 102.

In the preferred embodiment, the control center 114 uses either the initial request or the subsequent data stream to determine the location of the subscriber unit 108 by multilateration. Of course, those skilled in the art will recognize that other location-determining techniques could be used without departing from the scope of the present invention. Furthermore, those skilled in the art will recognize that determining the location of the subscriber unit 108 is not a necessary step to accomplishing the present invention.

The control center 114 verifies the identification of the subscriber unit 108 and transmits the initial request and subsequent data stream to a cellular phone identity service provider 112, which typically is a remote workstation or other type of computer system. However, those skilled in the art will recognize that the cellular phone identity service provider 112 could, in fact, be a workstation or other computer system operated by the vehicle location service 102 and residing at the control center 114.

The cellular phone identity service provider 112 manages a database or pool of cellular phone identities, and approves or denies call requests from the subscriber units 108. Approvals or denials may be performed manually by a dispatcher operating a workstation, or may be performed automatically using a computer program that operates based on pre-programmed rules for approvals and denials.

Generally, the cellular phone identities each comprise a mobile identification number (MIN) and an electronic serial number (ESN), although they may also comprise other operational parameters, such as a cellular phone service provider selection (i.e., "A" or "B"). Of course, while the present invention relates more generally to a pool comprised of a plurality of cellular phone identities or subscriptions, those skilled in the art will recognize that the pool could be comprised of a single cellular phone identity.

In the preferred embodiment, only enough cellular phone identities would be needed to cover the volume of concurrent calls expected in each cellular service area. Further, the pool of sharable cellular phone identities may be comprised of sub-pools organized in a relational manner, e.g., by cellular service provider, by fleet identity, or by any other convenient grouping of subscriber units.

The service provider 112 selects a suitable cellular phone identity from the pool for use in responding to a granted request. Generally, the selected cellular phone identity will be one not currently in use, as each identity typically will be used by only one cellular phone at a time. The selection of the cellular phone identity can be made dependent on the location of the subscriber unit 108, wherein the location is determined by a signal received from the subscriber unit 108 or by a location of a receiver site 118, 120, or 122 in the vehicle location system 102 that receives the request. The service provider 112 then transmits the cellular phone identity to the control center 114 of the vehicle location system 102 for downloading into the subscriber unit 108.

For emergency calls, such as 911 or roadside assistance, the authorization for the request could be pre-approved and possibly bypass the service provider 112. These services could use cellular identities owned and/or managed by the vehicle location service 102 or by third-party value-added resellers (VARs).

The control center 114 generates a cellular phone programming message using the selected cellular phone identity. The transmit site 116 then transmits the cellular phone programming message to the subscriber unit 108 in the form of a paging message. The subscriber unit 108 receives the cellular phone programming message, and passes it to the cellular phone 214. The cellular phone 214 decodes the cellular phone programming message, programs itself, and begins normal cellular phone operation via the cellular telephone network 104.

It is anticipated that the cellular phone identity would be encoded in a manner that would prevent cloning or fraudulent use of the service (e.g., with an identification of the service provider 112 and/or an identification of the subscriber unit 108). The cellular phone 214 would be pre-programmed at installation so that improperly encoded cellular phone identities would be rejected. Additional precautions such as password protection for incoming calls and for responses from the service provider 112 can also be implemented.

During the call, the cellular phone 214 may transmit one or more status messages via the vehicle location service 102 to the service provider 112. The service provider 112 would log these status messages, and use them to determine the usage of the cellular phone identity. Such information could be used for both control and billing purposes.

Upon completion of the call, the user presses END or presses END followed by a new telephone number to place another call. The cellular phone may retain the cellular phone identity for a pre-determined duration, such as a pre-determined number of calls or a pre-determined time period. Alternatively, the cellular phone identity may be released upon user command, or upon receipt of a command from the cellular identity service provider 112 or control center 114. When the cellular phone identity is released, the subscriber unit 108 sends a release or end service message via the vehicle location service 102 to the cellular phone identity service provider 112.

Upon release of the cellular phone identity or upon command from the cellular identity service provider 112, the VLU 202 erases the cellular phone identity from the memory of the cellular phone 214, rendering the cellular phone 214 inoperable. The cellular telephone 214 may then power off, returning the subscriber unit 108 to the standby/messaging/location mode.

One or more receive sites 118, 120, and 122 of the vehicle location service 102 receive the release message, and forward it to the control center 114 of the vehicle location service 102. In response, the control center 114 forwards the release message to the cellular phone identity service provider 112, which processes the release message by identifying the cellular phone identity as no longer being "in use" and thus available for another request. Upon completion of this process, the cellular phone identity service provider 112 returns the cellular phone identity to the pool for selection in another call request.

CALLS TO THE SUBSCRIBER UNIT

Figure 4:
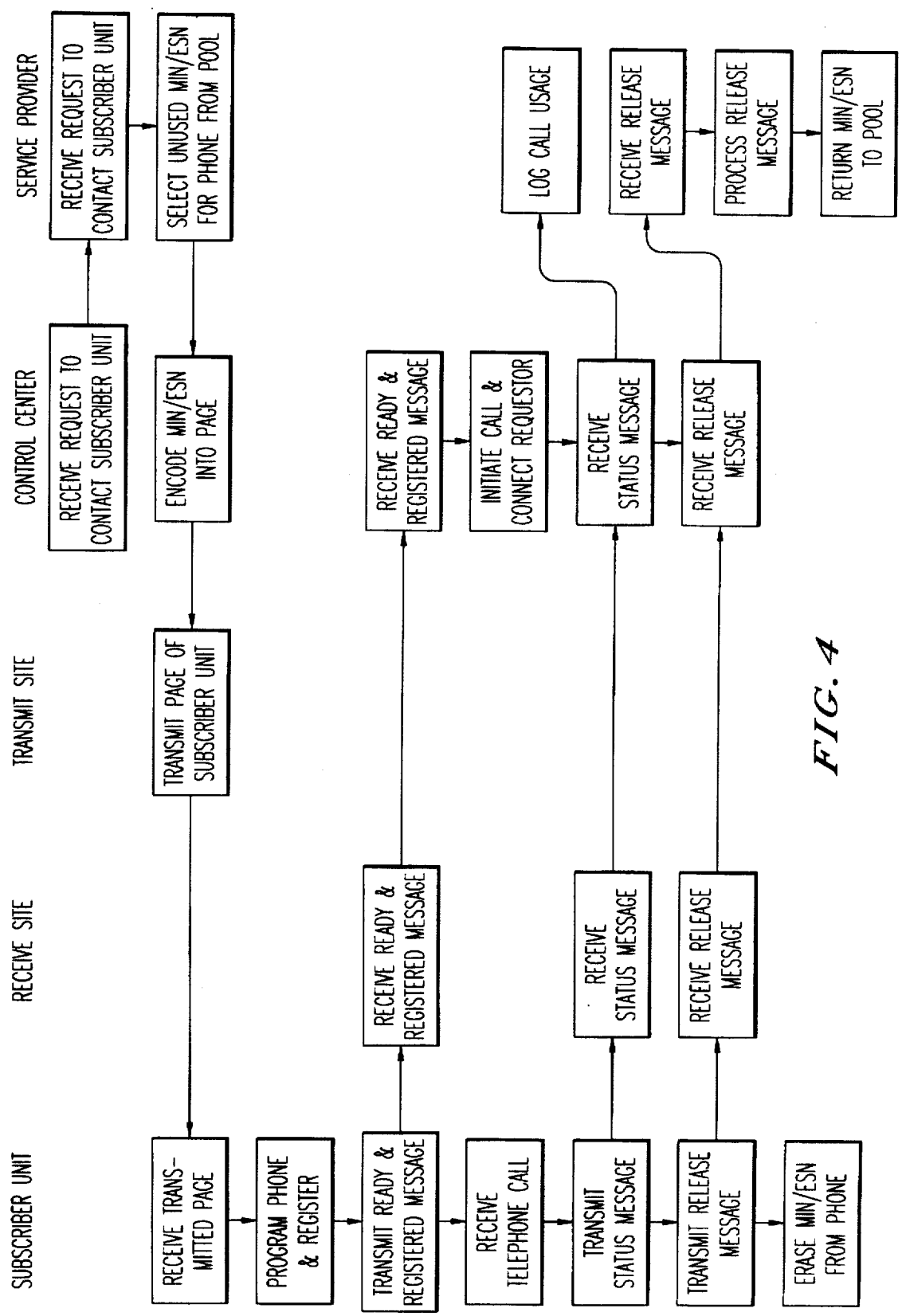
FIG. 4 is a diagram illustrating the operation of the present invention when a request for cellular phone service originates with a third party attempting to place a call to a properly configured subscriber unit.

FIG. 4 is a diagram illustrating the operation of the present invention when a request for cellular phone service originates with a third party 110 attempting to place a call to a cellular phone 214 of a subscriber unit 108. In the preferred embodiment, the caller (which may be a computer as well as a person) dials a telephone number associated with the desired subscriber unit 108 in a manner similar to that used paging.

The telephone number associated with the subscriber unit 108 is answered by a call processor operated by the service provider 112 or that is part of the control center 114 of the vehicle location service 102. The caller may page the subscriber unit 108, locate the subscriber unit 108, send a coded message to the subscriber unit 108, place a voice call to the subscriber unit 108, or establish a data connection with the subscriber 108, by entering an appropriate DTMF code after a connection is made (e.g., 1 to page, 2 to locate, 3 to talk, 4 for data connection, etc.).

If the caller enters the proper code to place a call or establish a data connection to the subscriber unit 108, the control center 114 transmits the request to the cellular phone identity service provider 112. This step in the process is not required if the call is placed directly to the service provider 112. The cellular phone identity service provider 112 approves or denies call requests to the subscriber units 108. If approved, the service provider 112 selects a suitable, e.g., unused, cellular phone identity from its pool of identities. The service provider 112 then transmits the cellular phone identity to the control center 114 of the vehicle location system 102 for downloading into the subscriber unit 108.

The control center 114 initiates a page message to the subscriber unit 108 indicating that an incoming call is being placed. This page message also contains the ESN, MIN, and cellular service provider to be used, as determined by the service provider 112 in a manner similar to that described above for outgoing calls.

The subscriber unit 108 receives the information, commands the cellular phone 214 to power on, and transfers the information (ESN, MIN, cellular service provider) to the cellular phone. The cellular phone 214 registers onto the selected cellular telephone network 104, and upon verification of service availability, the subscriber unit 108 notifies the control center 114 that it is ready to receive the incoming call. The control center 114 initiates a call to the MIN/ESN that was sent to the subscriber unit 108, and upon call establishment, connects the incoming call and the user in a manner similar to call forwarding.

During the call, the VLU 202 may transmit one or more status messages via the vehicle location service 102 to the service provider 112. The service provider 112 would log these status messages, and use them to monitor call progress and determine the usage of the cellular phone identity. Such information could be used for both control and billing purposes.

Upon completion of the call, cellular service is terminated using the same method described herein for calls from the subscriber unit 108.

CONCLUSION

This concludes the description of the preferred embodiment of the invention. In summary, the present invention discloses a method and apparatus for sharing cellular phone identities among a plurality of programmable cellular phones coupled to mobile units in a mobile unit location system wherein the cellular phone identities are downloaded into the cellular phones via a mobile unit location system. The cellular phone identities are downloaded to mobile units in response to the notification of incoming call to the cellular phone, or in response to a request for an outgoing call from the cellular phone. A cellular phone identity is received by the mobile unit from the service provider via the mobile location system in response to the transmitted request. The cellular phone connected to the mobile unit is then programmed with the cellular phone identity received from the cellular phone identity service provider.

The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

What is claimed is:

1. A method of sharing cellular phone identities among a plurality of mobile units in a mobile unit location system, comprising the steps of:
   (a) transmitting a request for a cellular phone identity from a mobile unit to a cellular phone identity service provider via the mobile unit location system;
   (b) receiving the cellular phone identity from the cellular phone identity service provider via the mobile unit location system in response to the transmitted request; and
   (c) programming a cellular phone connected to the mobile unit with the cellular phone identity received from the cellular phone identity service provider, said cellular phone not being required to have a permanent identity in a cellular phone network.

2. The method of claim 1 above, wherein the cellular phone identity comprises a mobile identification number.

3. The method of claim 2 above, wherein the cellular phone identity further comprises an electronic serial number.

4. The method of claim 2 above, wherein the cellular phone identity further comprises operational parameters.

5. The method of claim 4 above, wherein the operational parameters comprise a service provider selection.

6. The method of claim 1 above, wherein the method further comprises the step of transmitting a location signal from the mobile unit to the mobile unit location system, so that the mobile unit location system can determine a location of the mobile unit, and the receiving step further comprises the step of receiving a cellular phone identity from the cellular phone identity service provider based on the location of the mobile unit.

7. The method of claim 6 above, further comprising receiving a service provider selection from the cellular phone identity service provider based on a location of the mobile unit.

8. The method of claim 6 above, further comprising receiving a service provider selection from the cellular phone identity service provider based on a location of a receiver of the transmitted request in the mobile unit location system.

9. The method of claim 1 above, further comprising retaining the cellular phone identity in the cellular phone for a pre-determined interval.

10. The method of claim 1 above, further comprising transmitting a release message to the cellular phone identity service provider via the mobile unit, thereby relinquishing the cellular phone identity for another cellular phone.

11. The method of claim 10 above, further comprising erasing the cellular phone identity from the cellular phone when the cellular phone identity is relinquished.

12. The method of claim 10 above, further comprising erasing the cellular phone identity from the cellular phone upon command from the cellular phone identity service provider.

13. The method of claim 10 above, further comprising erasing the cellular phone identity from the cellular phone upon detection of a specified condition within the cellular phone.

14. The method of claim 1 above, wherein each cellular phone identity is used by only one cellular phone at a time.

15. The method of claim 1 above, further comprising receiving a cellular phone identity from a pool of sharable cellular phone identities managed by the cellular phone identity service provider.

16. The method of claim 15 above, wherein the pool of sharable cellular phone identities is comprised of sub-pools organized by according to a specified relationship among the cellular phone identities.

17. The method of claim 1 above, further comprising initiating a call from the cellular phone to a cellular telephone service provider.

18. The method of claim 1 above, further comprising restricting the cellular phone to calling one or more predefined phone numbers.

19. The method of claim 1 above, further comprising monitoring usage of the cellular phone and reporting the usage.

20. A method of sharing cellular phone identities among a plurality of mobile units in a mobile unit location system, comprising the steps of:

(a) receiving a request for a cellular phone identity from a mobile unit via the mobile unit location system; and (b) transmitting the cellular phone identity to the mobile unit via the mobile unit location system in response to the received request, so that a cellular phone connected to the mobile unit can be programmed with the cellular phone identity, said cellular phone not being required to have a permanent identity in a cellular phone network.

21. The method of claim 20, wherein said receiving step comprises the steps of:

transmitting a paging signal to said mobile unit from said mobile unit location system; and receiving said paging signal at said mobile unit and generating a response comprising a call destination and an identification code corresponding to said mobile unit.

22. The method as claimed in claim 21, wherein said receiving step further comprises the step of determining the location of said mobile unit using the arrival time of said request at each of a plurality of receive sites in said mobile unit location system.

23. The method as claimed in claim 21, wherein said receiving step further comprises the step of determining the location of said mobile unit using the arrival time of said response at each of a plurality of receive sites in said mobile unit location system.

24. The method as claimed in claim 21, wherein said receiving step further comprises the steps of:

receiving said response at said mobile unit location system;

verifying said mobile unit using said identification code; and transmitting a service signal from said mobile unit location system to a cellular service provider.

25. The method as claimed in claim 24, wherein said cellular service provider is located remotely with respect to said mobile unit location system.

26. The method as claimed in claim 24, wherein said cellular service provider comprises a computer connected directly to said mobile unit location system.

27. The method as claimed in claim 24, wherein said transmitting step comprises the steps of:

verifying said request; and selecting a cellular phone identity from a plurality of cellular phone identities in response to said request if said request is approved.

28. The method as claimed in claim 27, wherein said mobile unit uses said cellular phone identity for a duration of time determined using criteria selected from the group consisting of a predetermined period of time, a predetermined number of calls, duration of membership within a fleet of mobile units, and location of said mobile unit within a predefined geographic area.

29. The method as claimed in claim 27, wherein said verifying step comprises the step of automatically approving said request if said call destination is an emergency response unit.

30. The method as claimed in claim 20, further comprising the steps of:

generating a status message during a cellular call involving said mobile unit; and transmitting said status message from said mobile unit to a cellular service provider via said mobile unit location system, said cellular service provider using said status message to perform operations selected from the group consisting of monitoring usage of cellular service at said mobile unit, billing for cellular service usage, and sending control messages to said mobile unit.

31. The method as claimed in claim 30, further comprising the steps of:

generating a release message after a cellular call involving said mobile unit; and transmitting said release message from said mobile unit to said cellular service provider via said mobile unit location system.

32. A method of sharing cellular phone identities among a plurality of mobile units in a mobile unit location system, comprising the steps of:

(a) receiving a call request from a requester for a specific cellular phone connected to a specific mobile unit;

(b) selecting and transmitting a cellular phone identity to the specific mobile unit via the mobile unit location system in response to the call request, so that the specific cellular phone connected to the mobile unit can be programmed with the cellular phone identity, the specific cellular phone not being required to have a permanent identity in a cellular phone network; and (c) responding to the call request in a manner that allows the requester to contact the specific cellular phone.

33. The method as claimed in claim 32, wherein said receiving step comprises the steps of:

receiving said call request at one of a cellular service provider and said mobile unit location system, said mobile unit location system being operable to forward the call request to said cellular service provider; and verifying said call request.

34. The method as claimed in claim 33, wherein said selecting step comprises the step of transmitting said cellular phone identify from said cellular service provider to said mobile unit location system.

35. The method as claimed in claim 33, wherein said receiving step comprises the steps of:

receiving a code entered by said requester at said mobile unit location system;

processing said code to provide said requester with at least one of a plurality of options selected from the group consisting of sending a coded message to said specific mobile unit via a message signal generated and transmitted by said mobile unit location system, initiating a cellular call to said specific mobile unit, establishing a data connection with said specific mobile unit, and receiving data relating to the location of said specific mobile unit and determined by said mobile unit location system.

36. A system for allocating cellular phone identities to mobile units on a temporary basis comprising:

a mobile unit location system having a computer and a communication link between said computer and each of said mobile units;

a cellular service provider computer connected to said computer in said mobile unit location system;

a mobile unit location system transceiver located in each mobile unit for communicating with said computer;

a cellular phone transceiver located in each mobile unit; and a processor in each of said mobile units, said processor being connected to said mobile unit location system transceiver and said cellular phone transceiver, said processor being programmable to operate said cellular phone transceiver in response to signals generated by and received from said mobile unit location system, said mobile unit location system being configured to establish a cellular call at one of said mobile units by communicating with said cellular service provider and transmitting a cellular phone identity selected by said cellular service provider to said mobile unit using a corresponding said communication link, said processor being programmable to receive said cellular phone identity via said mobile unit location system transceiver, to store said cellular phone identity in a memory device corresponding to said processor and to command said cellular phone transceiver to operate in accordance with said stored cellular phone identity.

37. A system as claimed in claim 36, wherein said processor is programmable to erase said cellular phone identity from said memory device after a predetermined duration of time selected from the group consisting of upon receipt of a command from at least one of said mobile unit location system and said cellular service provider to release said cellular phone identity, after said user of said mobile unit indicates the end of a cellular call, after exceeding a predetermined limit on the number of calls that can be established using said cellular phone identity, and after a predetermined amount of time has elapsed since said cellular phone identity was allocated to said mobile unit.

* * * * *